United States Patent Office 3,389,080
Patented June 18, 1968

3,389,080
TREATMENT OF ION-EXCHANGE RESINS
Thomas Victor Arden, Cobham, Surrey, England, assignor to The Permutit Company Limited, London, England, a British company
No Drawing. Filed May 3, 1965, Ser. No. 452,885
Claims priority, application Great Britain, May 6, 1964, 18,871/64
3 Claims. (Cl. 210—32)

A common way of removing dissolved salts from water is to pass the water through a bed of mixed anion-exchange and cation-exchange resins. When the resins are exhausted they are regenerated by separating the two resins, usually by stratification, regenerating each separately, and then remixing them.

It is possible to use the resins as fine powders which are formed into a coating on a filter, which may be of the candle or leaf type.

The powdered resins in question may be used with advantage to treat condensate from boilers so as to render it suitable as boiler feed-water by removing traces of metal, particularly iron and copper, picked up in the boilers and condensers, and also by removing traces of silica.

Boiler condensate usually contains ammonium hydroxide, which is a desirable constituent of boiler feed-water. To prevent the ammonia being removed from solution, the cation-exchange resin can be in the ammonia form, with the added advantage that the capacity of the cation-exchange resin is not wasted in taking up the ammonia. Furthermore, the metals in all other salts present in the condensate, for example sodium chloride, are also exchanged for ammonia. Thus the cation-exchange resin becomes converted to the sodium and other metal forms in accordance with the salts present in the condensate, and in particular takes up any iron and copper.

For the purpose of removing silica it is necessary to use a strong-base anion-exchange resin in the hydroxide form. The anion-exchange resin becomes converted mainly to the chloride, carbonate and silicate forms. Thus the water contains ammonium hydroxide in place of the original metal salts.

Although the use of such powdered resins, which may be of average particle size from 30 to 120 microns, but more usually from 50 to 75 microns, has certain advantages, it presents the disadvantage that it is not possible to regenerate the resins in the ordinary way because the particle size is so small that a mixture of them cannot be treated as a bed or column in a standard vessel. It has therefore hitherto been necessary to discard such powdered resins when they have become exhausted.

According to the invention a layer of mixed powdered resins on a filter is periodically regenerated in situ to the hydroxide and ammonia forms respectively. This is done by passing three solutions in succession through the filter. Firstly, a solution of an alkali metal salt such as sodium chloride, advantageously at a concentration of about 5% by weight, is passed through the resin; secondly, a solution of an alkali metal hydroxide, such as sodium hydroxide, advantageously at about 2% by weight; and thirdly, a solution of ammonium hydroxide, also advantageously at about 2% by weight.

The first of these solutions converts the cation-exchange resin to the form of the metal in the solution, and the anion-exchange resin to the form of the anion in the solution, for example to the sodium and chloride forms. The second solution only converts the cation-exchange resin if a different cation is used, but regenerates the anion-exchange resin to the hydroxide form. The third solution regenerates the cation-exchange resin to the ammonium form and does not affect the anion-exchange resin.

The use of a solution of ammonium hydroxide alone is not sufficient to regenerate a strongly basic anion-exchange resin to the hydroxide form, and for this the solution of a strong alkali has to be used. If this strong alkali were used at a stage when the resin contained any metal such as copper or iron capable of forming an insoluble hydroxide, that hydroxide would be precipitated in the resin and clog it. By first passing the solution of an alkali metal salt through the filter such metals are removed before the strong alkali necessary to regenerate the resin to the hydroxide form comes into contact with the resin.

An example of the process carried out with a filter of the candle type will now be given.

The powdered resins used are 60 microns in average particle size. The cation-exchange resin is a cross-linked styrene polymer charged with sulphonic acid groups, and the anion-exchange resin a similar cross-linked polymer charged with quaternary ammonium groups. These resins are used in the proportion of 9 parts of the cation resin to 1 part of the anion resin by weight to give a total volume of 186 ccs., which in use forms a layer 2 mm. thick on the filter.

Boiler condensate is passed through this precoated filter. The composition of this condensate is not constant, but typically it contains the following in parts per thousand million:

Ammonia (as $NH_3$) _____ 185
Silica (as $SiO_2$) _____ 38
Copper (as Cu) _____ 42
Iron (as Fe) _____ 215

The composition of the filtered effluent of course varies with that of the influent condensate, but with the typical values given above is about as follows, again in parts per thousand million:

Ammonia (as $NH_3$) _____ 193
Silica (as $SiO_2$) _____ 9
Copper (as Cu) _____ 4
Iron (as Fe) _____ 8

The flow of the condensate through the filter is at the rate of 10 gallons per square foot, per minute, and the flow continues until rise in the metal content shows the need for regeneration. Thereupon, flow to drain at the rate of 150 mls./minute is established and the flow to service is stopped. Next, 1500 mls. of 5% NaCl solution are passed through the filter to drain at approximately 100 mls. per minute. Thirdly, 1500 mls. of 2% NaOH solution are passed through the filter to drain at approximately 100 mls. per minute. Fourthly, 3000 mls. of 2% $NH_4OH$ solution are passed through the filter to drain at approximately 200 mls. per minute. When this solution has been passed through the filter this condensate is again passed through it to flow to drain at a rate of 10 gallons per square foot per minute until the quality of the effluent is satisfactory. Thereupon, flow to service is resumed.

I claim:
1. A method of regenerating mixed cation-exchange and anion-exchange powdered resins present as a layer on a filter which comprises successively passing through the layer a solution of an alkali metal salt, a solution of an alkali metal hydroxide and a solution of ammonium hydroxide.
2. A method according to claim 1 in which the alkali metal salt is sodium chloride and the alkali metal hydroxide is sodium hydroxide.
3. A method of treating boiler condensate to render it suitable as boiler feed-water which comprises passing the condensate through a filter coated with a layer of a powdered mixture of a cation-exchange resin in the ammonium form and an anion-exchange resin in the hydroxide form, and periodically regenerating the layer by successively passing through it a solution of sodium chloride, a solution of sodium hydroxide and a solution of ammonium hydroxide.

References Cited
UNITED STATES PATENTS

| | | | |
|---|---|---|---|
| 2,658,042 | 11/1953 | Johnson | 210—37 X |
| 3,250,702 | 5/1966 | Levendusky | 210—75 X |
| 3,250,704 | 5/1966 | Levendusky | 210—37 X |
| 3,250,705 | 5/1966 | Levendusky | 210—32 X |

FOREIGN PATENTS 672,803    10/1963    Canada.

REUBEN FRIEDMAN, *Primary Examiner.*
C. DITLOW, *Assistant Examiner.*